(12) United States Patent
Jung et al.

(10) Patent No.: US 9,420,247 B2
(45) Date of Patent: Aug. 16, 2016

(54) WHITE BALANCE CORRECTING APPARATUS AND WHITE BALANCE CORRECTING METHOD FOR WHITE BALANCE CORRECTION IN COMPLEX LIGHT CONDITION

(71) Applicant: HANWHA TECHWIN CO., LTD., Changwon-si (KR)

(72) Inventors: Bo A Jung, Changwon-si (KR); Young Je Jung, Changwon-si (KR); Eun Jeong Kim, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 37 days.

(21) Appl. No.: 14/480,796

(22) Filed: Sep. 9, 2014

(65) Prior Publication Data

US 2015/0271460 A1     Sep. 24, 2015

(30) Foreign Application Priority Data

Mar. 18, 2014   (KR) .......................... 10-2014-0031812

(51) Int. Cl.
*H04N 9/73*      (2006.01)
*H04N 9/04*      (2006.01)
*H04N 1/60*      (2006.01)

(52) U.S. Cl.
CPC ............. *H04N 9/735* (2013.01); *H04N 1/6077* (2013.01); *H04N 1/6086* (2013.01); *H04N 9/04* (2013.01)

(58) Field of Classification Search
CPC ........ H04N 9/735; H04N 1/6077; H04N 9/04
See application file for complete search history.

(56) References Cited

U.S. PATENT DOCUMENTS

| | | | |
|---|---|---|---|
| 7,542,077 B2 | 6/2009 | Miki | |
| 7,949,185 B2 | 5/2011 | Kim et al. | |
| 8,704,910 B2 | 4/2014 | Kim et al. | |
| 8,854,709 B1 * | 10/2014 | Liu | .......................... H04N 9/73 348/223.1 |
| 2002/0101516 A1 * | 8/2002 | Ikeda | ...................... H04N 9/735 348/223.1 |
| 2009/0102944 A1 * | 4/2009 | Nishizawa | ............. H04N 9/735 348/223.1 |
| 2010/0039528 A1 * | 2/2010 | Ogasahara | .............. G06T 5/009 348/223.1 |
| 2011/0304752 A1 * | 12/2011 | Lee | ...................... H04N 5/3572 348/251 |

FOREIGN PATENT DOCUMENTS

| | | | |
|---|---|---|---|
| JP | 2009-094997 A | 4/2009 | |
| JP | 5225403 B2 | 3/2013 | |
| KR | 10-0918701 B1 | 9/2009 | |
| KR | 10-2010-0095827 A | 9/2010 | |

* cited by examiner

*Primary Examiner* — Nicholas Giles
(74) *Attorney, Agent, or Firm* — Sughrue Mion, PLLC (57) ABSTRACT

A white balance correcting apparatus and a white balance correcting method are provided. A white balance correcting apparatus includes a white balance corrector configured to divide an input image into a plurality of blocks, determine, using a reference color temperature line, adjusted color temperatures of blocks included in a white area among the plurality of blocks, and calculate red (R) and blue (B) gains to which different weights are applied according to the adjusted color temperatures of the blocks.

19 Claims, 8 Drawing Sheets

| COLOR TEMPERATURE | 11,000 DEGREES (HIGH) → | | | | | | | | | | | | 1,700 DEGREES (LOW) |
|---|---|---|---|---|---|---|---|---|---|---|---|---|---|
| Dr | -50 | -30 | -10 | 30 | 50 | 110 | 170 | 240 | 300 | 400 | 500 | 600 | 710 | 800 | 980 |
| Db | -220 | -200 | -170 | -120 | -90 | -30 | 30 | 110 | 130 | 150 | 175 | 190 | 210 | 230 | 280 |
| WEIGHT | 1.1 | 1.1 | 1.1 | 1.1 | 1.1 | 1.0 | 1.0 | 1.0 | 1.0 | 1.0 | 0.9 | 0.9 | 0.9 | 0.9 | 0.9 |

<HIGH COLOR TEMPERATURE PRIORITY>

FIG. 4B

| COLOR TEMPERATURE | 11,000 DEGREES (HIGH) → | | | | | | | | | | | | 1,700 DEGREES (LOW) |
|---|---|---|---|---|---|---|---|---|---|---|---|---|---|
| Dr | -50 | -30 | -10 | 30 | 50 | 110 | 170 | 240 | 300 | 400 | 500 | 600 | 710 | 800 | 980 |
| Db | -220 | -200 | -170 | -120 | -90 | -30 | 30 | 110 | 130 | 150 | 175 | 190 | 210 | 230 | 280 |
| WEIGHT | 0.9 | 0.9 | 0.9 | 0.9 | 0.9 | 1.0 | 1.0 | 1.0 | 1.0 | 1.0 | 1.1 | 1.1 | 1.1 | 1.1 | 1.1 |

<LOW COLOR TEMPERATURE PRIORITY>

FIG. 8

WHITE BALANCE CORRECTING APPARATUS AND WHITE BALANCE CORRECTING METHOD FOR WHITE BALANCE CORRECTION IN COMPLEX LIGHT CONDITION

CROSS-REFERENCES TO RELATED APPLICATIONS

This application claims priority from Korean Patent Application No. 10-2014-0031812, filed on Mar. 18, 2014, in the Korean Intellectual Property Office, the disclosure of which is incorporated herein in its entirety by reference.

BACKGROUND

1. Field

Apparatuses and methods consistent with exemplary embodiments relate to a white balance correcting apparatus and a white balance correcting method.

2. Description of the Related Art

White balance correction refers to a color correction function that detects white having the greatest change in an object color due to a light source in an environment corresponding to input image data (that is, the environment which is captured in an image), determines a color temperature from a Red/Green/Blue (RGB) contrast ratio of the detected white, corrects red (R) and blue (B) based on the color temperature with reference to the detected white, and shifts an entire color sense to adjust color balance.

Figure 1:
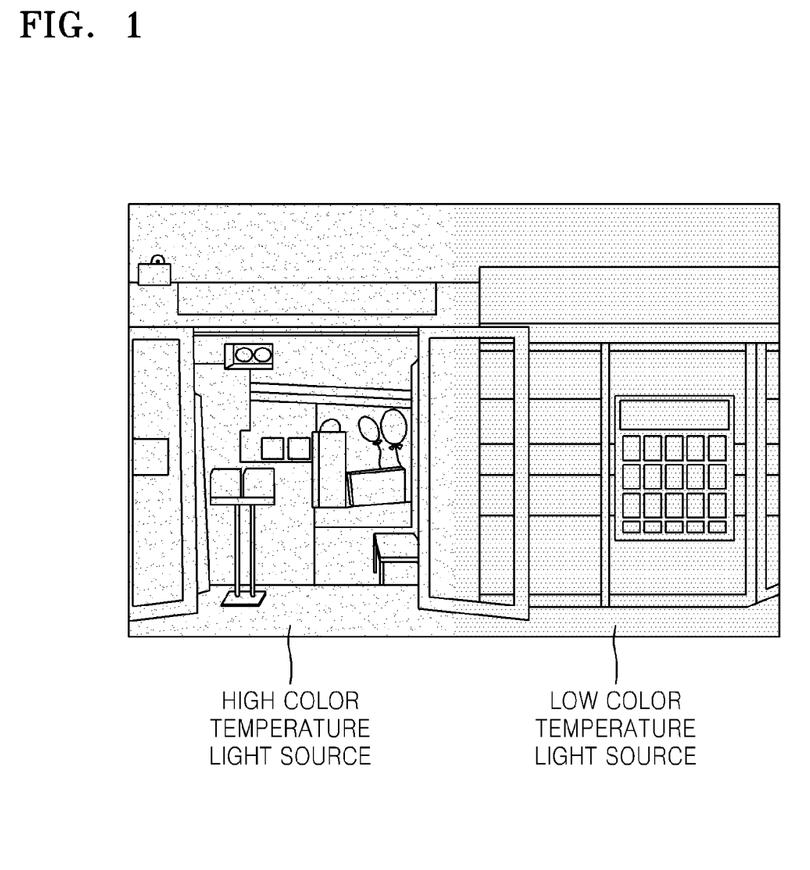
FIG. 1 is a diagram illustrating a white balance correction result under complex light according to the related art.

A general white balance correction algorithm is designed to mainly operate with monochromatic light, without considering a condition in which an image is captured in a complex light environment. FIG. 1 is a diagram illustrating a white balance correction result under complex light according to the related art. Referring to FIG. 1, in a complex light condition in which a high color temperature light source and a low color temperature light source are included on the left and right sides of an image, respectively, a B gain is determined to be large because a white balance correction mainly operates with the low color temperature light source. Accordingly, the left side of the image illuminated by the high color temperature light source is strongly tinged with B.

Therefore, when a white balance correction is performed in a complex light condition, color may be distorted because the white balance correction is not performed or is concentrated on a specific light source, resulting in image quality degradation.

SUMMARY

One or more exemplary embodiments provide a white balance correcting apparatus and a white balance correcting method, capable of minimizing color distortion due to light sources and improving image quality by performing a white balance correction of dividing an image into a plurality of blocks, classifying color temperatures with respect to each block, and applying different weights for each color temperature according to light source priority.

Additional aspects will be set forth in part in the description which follows and, in part, will be apparent from the description, or may be learned by practice of the exemplary embodiments.

Accordingly to an aspect of an exemplary embodiment, there is provided white balance correcting apparatus including: a white balance corrector configured to divide an input image into a plurality of blocks, determine, using a reference color temperature line, adjusted color temperatures of blocks included in a white area among the plurality of blocks, and calculate R and B gains to which different weights are applied according to the adjusted color temperatures of the blocks.

The white balance correcting apparatus may further include a preprocessor configured to provide the white area and the reference color temperature line, and provide a weight table in which the weights to be applied are set based on a light source priority mode.

The preprocessor may include: an extractor configured to extract the white area by measuring different white data according to color temperatures of the plurality of blocks; a provider configured to provide the reference color temperature line indicating a distribution of white according to the color temperatures of the plurality of blocks, so as to determine the adjusted color temperatures; and a setter configured to set the weights to be applied based on the light source priority mode in the form of the weight table.

The white balance correcting apparatus may further include a mode selector configured to select the light source priority mode for a white balance correction from among a plurality of light source priority modes.

The white balance corrector may include: a divider configured to divide the input image into the plurality of blocks; an area determiner configured to determine whether color information of the blocks is included in the white area; a color temperature determiner configured to determine, using the reference color temperature line, the adjusted color temperatures based one the color information of the blocks included in the white area; a gain calculator configured to calculate an R gain and a B gain of each of the blocks included in the white area, based on an RGB average value of each of the respective blocks; and a weight applicator configured to load a weight table corresponding to the selected light source priority mode, extract, from the weight table, weights corresponding to the adjusted color temperatures of each of the blocks included in the white area, and apply the extracted weights to the R gain and the B gain of each of the respective blocks.

The white balance correcting apparatus may further include a data converter configured to convert the RGB average value of each of the blocks included in the white area to a YCbCr color space, calculate Db and Dr values by normalizing Cb and Cr values with a Y value, and provide the Db and Dr values as the color information of each of the respective blocks.

The area determiner may be further configured to exclude blocks of the plurality of blocks, the color information of which are not included in the white area, from the white balance correction.

The white balance correcting apparatus may further include an average gain calculator configured to calculate averages of the R gains and the B gains, to which the weight is applied, with respect to the plurality of blocks, and set the calculated averages as a total R gain and a total B gain, respectively.

In response to the color information of a block of the plurality of blocks being positioned adjacent to the reference color temperature line, the color temperature determiner may be further configured to determine a point, which has a closest distance from the color information of the block to the reference color temperature line, as the adjusted color temperature of the block.

According to an aspect of another exemplary embodiment, there is provided a white balance correcting method including: dividing an input image into a plurality of blocks; determining whether color information of the plurality of blocks is included in a white area; determining, using a reference color temperature line, an adjusted color temperature with respect to the color information of blocks included in the white area among the plurality of blocks; calculating a red (R) gain and a blue (B) gain of the blocks included in the white area, based on an RGB average value of each of the blocks; and loading a weight table corresponding to a light source priority mode, extracting weights from the weight table according to the determined adjusted color temperatures, and applying extracted weights to the R gain and the B gain of each of the blocks, respectively.

The white balance correcting method may further include providing the white area, providing the reference color temperature line, and providing the weight table in which the weights to be applied are set based on the light source priority mode.

The providing the white area may include extracting the white area by measuring different white data according to color temperatures of the plurality of blocks; the providing the reference color temperature line may include providing the reference color temperature line indicating distribution of white according to the color temperatures of the plurality of blocks, so as to determine the adjusted color temperatures; and providing the weight table may include setting the weights to be applied based on the adjusted color temperatures with respect to the light source priority mode in the form of the weight table.

The white balance correcting method may further include selecting the light source priority mode for a white balance correction from among a plurality of light source priority modes.

The white balance correcting method may further include converting the RGB average value of each of the blocks to a YCbCr color space, calculating Db and Dr values by normalizing Cb and Cr values with a Y value, and providing the Db and Dr values as the color information of each of the respective blocks.

Blocks of the plurality of blocks, the color information of which are not included in the white area, may be excluded from the white balance correction.

The white balance correcting method may further include calculating averages of the R gain and the B gain of each of the blocks, to which the weight is applied, with respect to the plurality of blocks, and setting the calculated averages as a total R gain and a total B gain, respectively.

In response to the color information of a block of the plurality of blocks being positioned adjacent to the reference color temperature line, determining a point, which has a closest distance from the color information of the block to the reference color temperature line, as the adjusted color temperature of the block.

According to an aspect of another exemplary embodiment, there is provided a non-transitory computer readable medium having recorded thereon a program, which when executed by a computer, causes the computer to perform a method including: dividing an image into a plurality of blocks; determining adjusted color temperatures of blocks included in a white area among the plurality of blocks; and calculating red (R) and blue (B) gains to which different weights are applied based on the determined adjusted color temperatures of the blocks.

The adjusted color temperatures may be determined based on color information of the blocks and a reference color temperature line.

The weights to be applied may be extracted from a weight table corresponding to a selected light source priority mode among a plurality of light source priority modes.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Reference will now be made in detail to exemplary embodiments, with reference to the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description.

The above objects, features and advantages of the exemplary embodiments will become more apparent from the following description taken in conjunction with the accompanying drawings. The exemplary embodiments may be modified variably and may have various forms, particular examples of which will be illustrated in drawings and described in detail. However, it will be understood that the exemplary embodiments are not limited to the descriptions herein and may include all modifications, equivalents and substitutions falling within the spirit and scope of the inventive concept, as defined by the appended claims. In the following description, detailed descriptions of well-known functions or configurations will be omitted since they would unnecessarily obscure the exemplary embodiments.

The terms used in the present specification are merely used to describe particular exemplary embodiments, and are not intended to limit the exemplary embodiments. As used herein, the singular forms "a", "an", and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components. It will be understood that although the terms "first", "second", etc. may be used herein to describe various components, these components should not be limited by these terms. Instead, these terms are only used to distinguish one component from another.

Hereinafter, certain exemplary embodiments will be described in detail with reference to the accompanying drawings.

Figure 2:
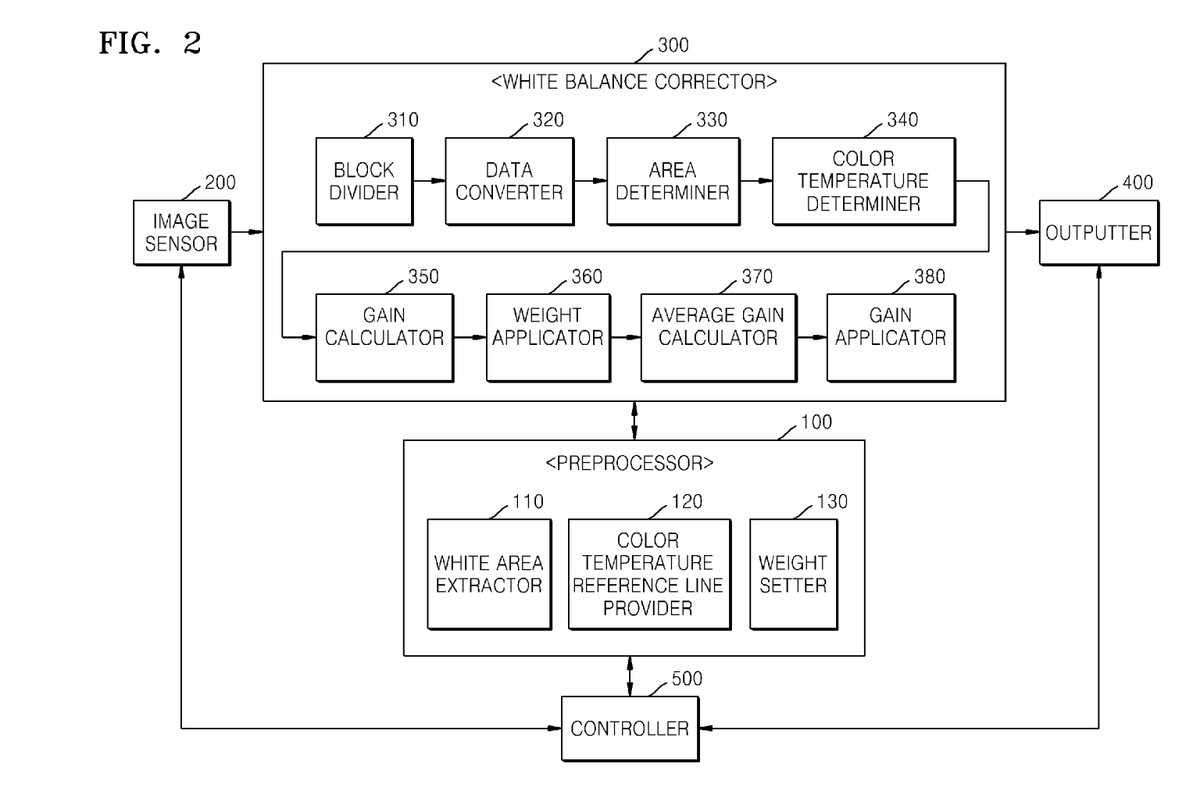
FIG. 2 is a block diagram illustrating a configuration of a white balance correcting apparatus according to an exemplary embodiment.

FIG. 2 is a block diagram illustrating a configuration of a white balance correcting apparatus according to an exemplary embodiment.

Referring to FIG. 2, the white balance correcting apparatus includes a preprocessor 100, an image sensor 200, a white balance corrector 300, an outputter 400, and a controller 500. The white balance correcting apparatus may further include at least one of a processor, such as a center processing unit (CPU) and a microprocessor, a hardware module, or a circuit to perform the functions provided by the white balance correcting apparatus.

Another exemplary embodiment may disclose that any of the preprocessor 100, the white balance corrector 300, and the controller 500 may include at least one of a processor, a hardware module, or a circuit for performing their respective functions.

The preprocessor 100 provides a white area and a reference color temperature line, and provides a weight table in which weights to be applied based on color temperatures with respect to each light source priority mode are set. The preprocessor 100 includes a white area extractor 110, a color temperature reference line provider 120, and a weight setter 130.

Figure 3A:
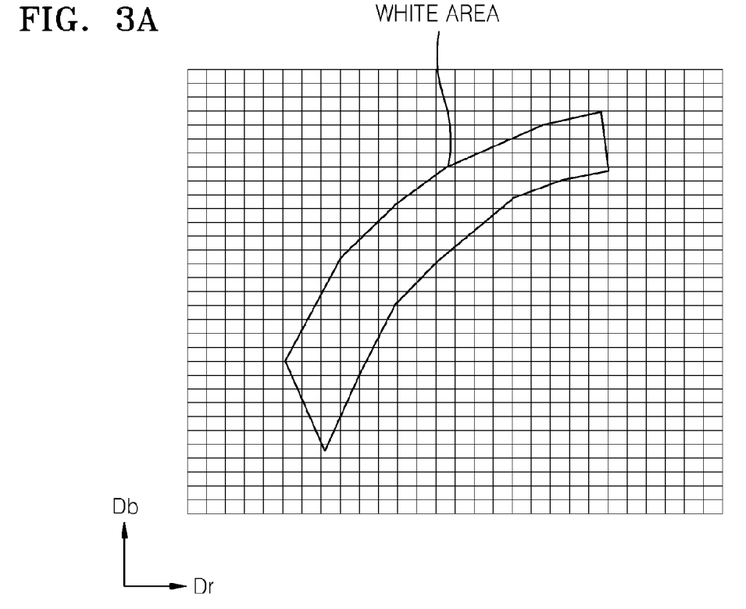
FIGS. 3A and 3B are diagrams illustrating a preprocessed white area and a reference color temperature line according to an exemplary embodiment, respectively.

The white area extractor 110 extracts a white area by measuring different white data with respect to each color temperature. The white area is illustrated in FIG. 3A. Referring to FIG. 3A, only color information (Dr, Db) that is included in the white area is used for the white balance correction, and color information that is not included in the white area is excluded from the white balance correction.

Figure 3B:
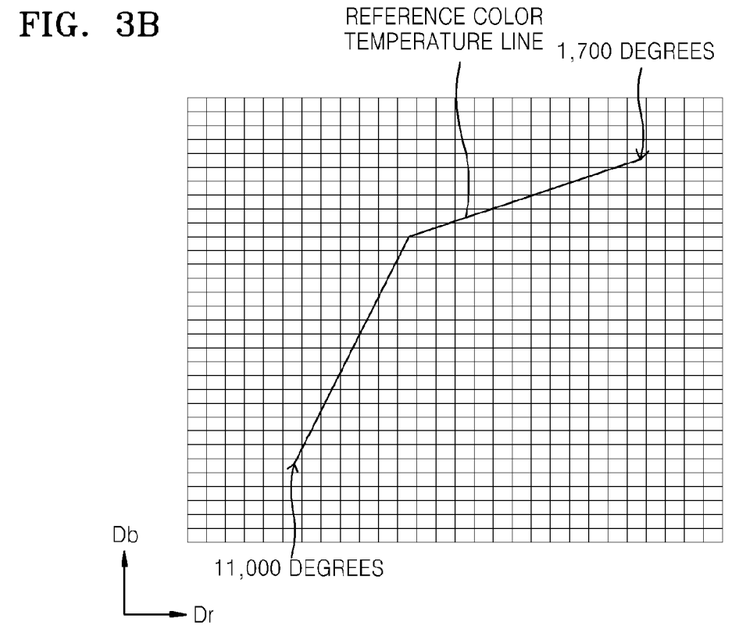

The color temperature reference line provider 120 provides a reference color temperature line indicating the distribution of white according to the color temperature. The reference color temperature line is illustrated in FIG. 3B. Referring to FIG. 3B, the color temperature of the color information (Dr, Db) may be determined using the reference color temperature line.

Figure 4A:
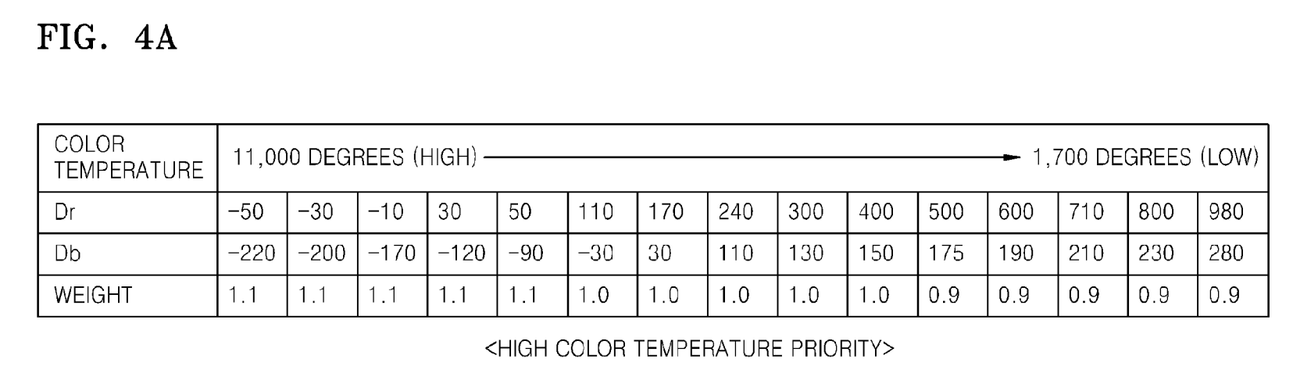
FIGS. 4A and 4B are weight tables for color temperatures with respect to each preprocessed light source priority mode according to an exemplary embodiment.
Figure 4B:
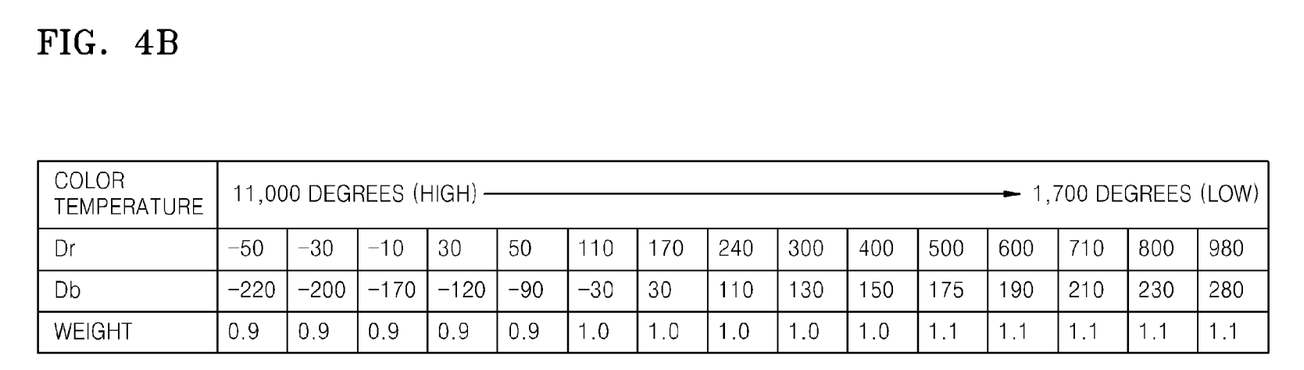

The weight setter 130 sets weights to be applied based on the color temperatures with respect to each light source priority mode in the form of the weight table. The weight tables for color temperatures with respect to each light source priority mode are illustrated in FIGS. 4A and 4B. FIG. 4A illustrates a weight table for color temperatures in a high color temperature priority mode. It can be seen from FIG. 4A that a greater weight is set to a higher color temperature area. FIG. 4B illustrates a weight table for color temperatures in a low color temperature priority mode. It can be seen from FIG. 4B that a greater weight is set to a lower color temperature area. As described above, the weight tables for color temperatures with respect to each light source priority mode have been described as being limited to the high color temperature priority mode and the low color temperature priority mode, but the weight tables are not limited thereto. The weight table may also be set to other light source priority modes, for example, a mercury lamp priority mode, a sodium lamp priority mode, and the like. In addition, the weights may be changed according to specifications of apparatuses.

The white area, the reference color temperature line, and the weight tables, which are set by the preprocessor 100, may be loaded on the white balance corrector 300 at the time of the white balance correction under the control of the controller 500.

The image sensor 200 is an image pick-up device that photoelectrically converts an image taken by a lens (not illustrated) to an electric signal. The image sensor 200 outputs an accumulated signal every frame, for example, every 1/30 second. Examples of the image sensor 200 may include a charge coupled device (CCD) and a complementary metal-oxide semiconductor image sensor (CIS), but are not limited thereto. The sensitivity of the image sensor 200 may be adjusted by the controller 500.

Prior to the white balance correction, a light source priority mode to be used for the white balance correction is selected. The controller 500 provides a user with a menu (not illustrated) for selecting the light source priority mode. For example, the controller 500 provides a menu allowing a user to use one of a high color temperature priority mode, a low color temperature priority mode, a mercury lamp priority mode, and a sodium lamp priority mode. When one of the light source priority modes is selected, the controller 500 loads the corresponding weight table from the preprocessor 100 to the white balance corrector 300, based on the white area, the reference color temperature line, and the selected light source priority mode.

The white balance corrector 300 performs the white balance correction on the input image from the image sensor 200 by using the weight table loaded from the preprocessor 100, based on the white area, the reference color temperature line, and the selected light source priority mode. The white balance corrector 300 divides the input image into a plurality of blocks, determines the color temperatures of blocks included in the white area by using the reference color temperature line, and calculates R and B gains to which different weights are applied according to the color temperatures of the blocks.

The white balance corrector 300 includes a block divider 310, a data converter 320, an area determiner 330, a color temperature determiner 340, a gain calculator 350, a weight applicator 360, an average gain calculator 370, and a gain applicator 380.

Figure 5:
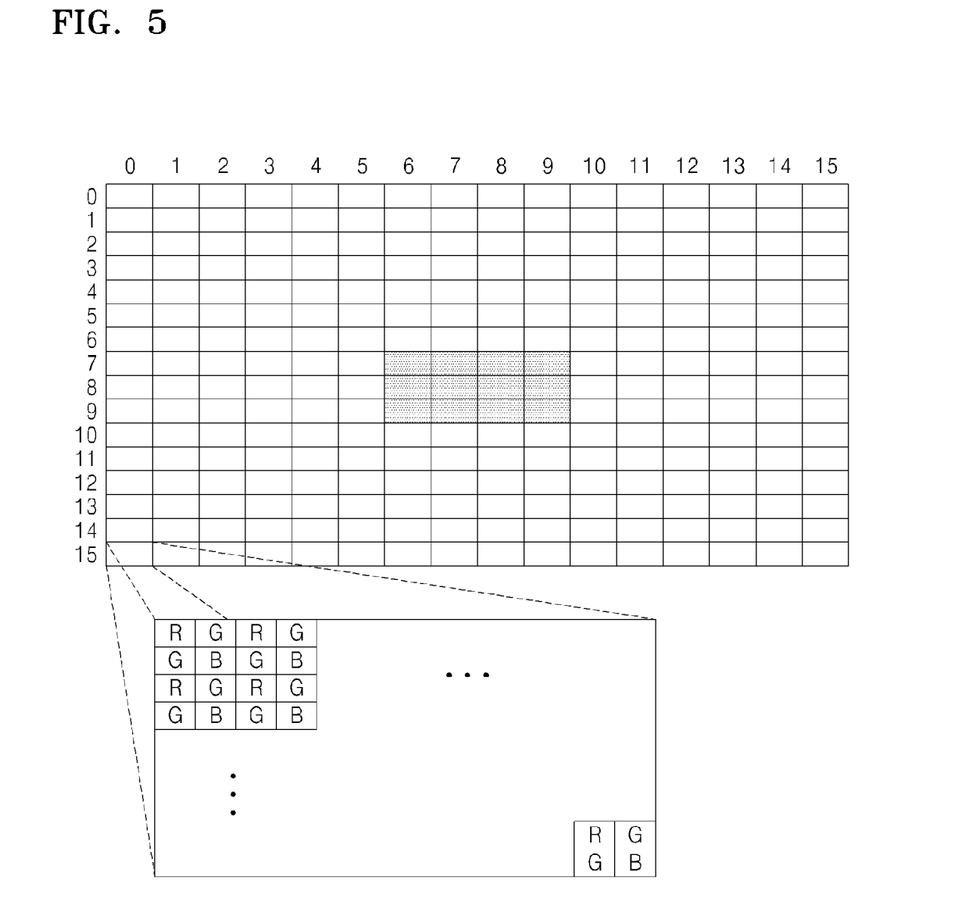
FIG. 5 is a diagram illustrating block division according to an exemplary embodiment.

The block divider 310 divides the input image into a plurality of blocks (e.g., M×N blocks). FIG. 5 is a diagram illustrating an example of a block division that divides the input image into 16×16 blocks. For example, the block divider 310 may divides an input image having a resolution of 1024×768 into 256 blocks each including 64×48 pixels. However, this is merely exemplary and the number of the division blocks may be changed according to setting.

The data converter 320 calculates an RGB average value of each block, converts the RGB average value to a YCbCr color space, and calculates color information (that is, Db and Dr values) by normalizing Cb and Cr values with a Y value. Using Equation 1 below, the RGB may be converted to the YCbCr color space, and the Db and Dr values may be calculated.

$$Y = 0.299R + 0.587G + 0.114B$$
$$Cb = -0.16874R - 0.33126G + 0.5B$$
$$Cr = 0.5R - 0.41569G - 0.08131B$$
$$Dr = \frac{Cr}{Y} \times 1023$$
$$Db = \frac{Cb}{Y} \times 1023$$

[Equation 1]

Figure 6A:
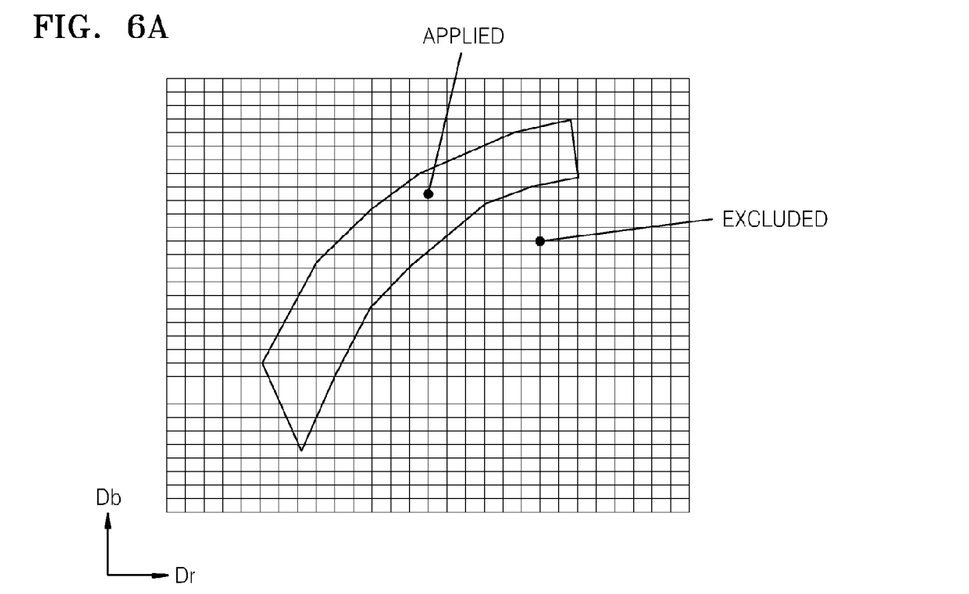
FIGS. 6A and 6B are diagrams describing a white area determination and a color temperature determination according to an exemplary embodiment, respectively.

The area determiner 330 determines whether the color information (Dr, Db) of each block converted by the data converter 320 is included in the white area. Referring to FIG. 6A, the white balance correction is performed with respect to the color information (Dr, Db) of blocks that are included in the white area, and the white balance correction is excluded with respect to the color information (Db, Db) of blocks that are not included in the white area.

Figure 6B:
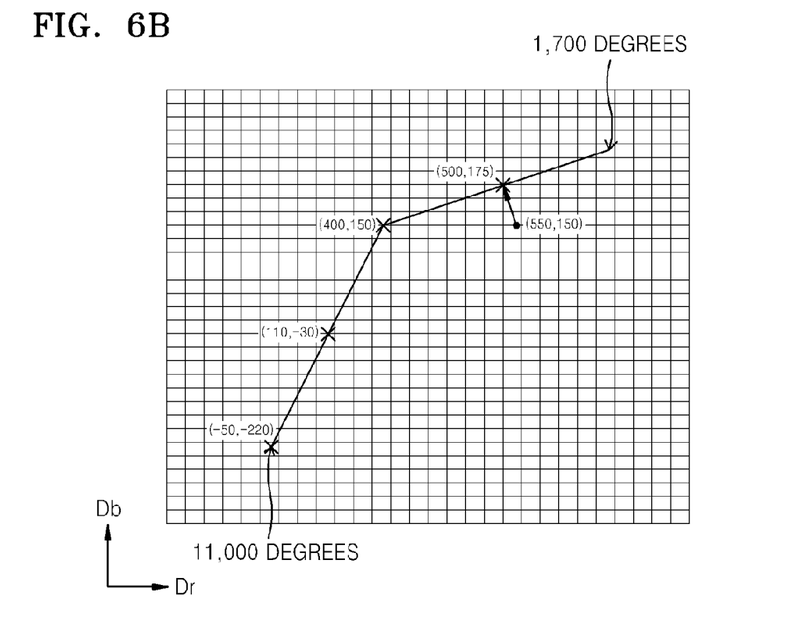

The color temperature determiner 340 determines the color temperature with respect to the color information (Dr, Db) of each block included in the white area by using the reference color temperature line. Referring to FIG. 6B, when color information of an arbitrary block is positioned adjacent to the reference color temperature line, a point having the closest distance from the color information of the corresponding block to the reference color temperature line may be determined as the color temperature of the corresponding block.

The gain calculator 350 calculates an R gain and a B gain with reference to the RGB average value of each block included in the white area. The R gain and the B gain may be calculated using Equation 2 below.

$$R \text{ gain} = \frac{G}{R}$$
$$B \text{ gain} = \frac{G}{B}$$ [Equation 2]

The weight applicator 360 loads the weight table corresponding to the selected light source priority mode, extracts the weight from the weight table according to the color temperature determination result, and applies the extracted weight to the R gain and the G gain. Using Equation 3 below, the R gain (block R gain) to which the weight is applied and the B gain (block B gain) to which the weight is applied may be calculated.

Block R gain=R gain×Weight

Block B gain=B gain×Weight  [Equation 3]

For example, when the selected light source priority mode is a high color temperature priority mode, the weight applicator 360 loads the weight table of FIG. 4A. The color information (Dr, Db) positioned on the reference color temperature line of FIG. 6B is matched with the color information (Dr, Db) included in the weight table of FIG. 4A. The color information of most blocks is positioned adjacent to the reference color temperature line. Therefore, as illustrated in FIG. 6B, the point, which is positioned on the reference color temperature line and has the closest distance from the color information of the arbitrary block, positioned adjacent to the reference color temperature line, to the reference color temperature line, is determined as the color temperature of the corresponding block. When the color temperature is determined, the weight matched with the color information (Dr, Db) corresponding to the determined color temperature is extracted from the weight table of FIG. 4A, and the extracted weight is applied to the R gain and the G gain.

For example, when the color information (Dr, Db) of the arbitrary block is (550, 150) as illustrated in FIG. 6B, the color information of the corresponding block is positioned adjacent to the reference color temperature line, and no weight exists in the weight table of FIG. 4A. Therefore, the point, which is positioned on the reference color temperature line and has the closest distance from the color information of the arbitrary block, positioned adjacent to the reference color temperature line, to the reference color temperature line, is determined as the color temperature of the corresponding block. When the color temperature is determined, the weight "0.9" matched with the color information (500, 175) corresponding to the determined color temperature is extracted from the weight table of FIG. 4A, and the extracted weight "0.9" is applied to the R gain and the G gain.

The average gain calculator 370 calculates the averages of the R gain and the B gain, to which the weight is applied, with respect to all blocks, and sets the calculated averages as a total R gain and a total B gain. The total R gain and the total B gain may be calculated using Equation 4 below.

$$\text{Total } R \text{ gain} = \frac{\sum_{M \times N \text{ blocks}} \text{Block } R \text{ gain}}{M \times N \text{ blocks}}$$

$$\text{Total } B \text{ gain} = \frac{\sum_{M \times N \text{ blocks}} \text{Block } B \text{ gain}}{M \times N \text{ blocks}}$$ [Equation 4]

The gain applicator 380 performs the white balance correction by applying the total R gain and the total B gain to the input image.

The outputter 400 outputs the white-balance-corrected image to a display device (not illustrated), and the controller 500 controls the overall operations of the preprocessor 100, the image sensor 200, the white balance corrector 300, and the outputter 400. Although not illustrated, it is obvious that the white balance correcting apparatus according to the exemplary embodiment may further include a storage device (i.e., a memory) (not illustrated) that stores various data necessary for image signal processing.

As described above, it is possible to minimize color distortion due to light sources and improve image quality by performing the white balance correction by dividing the image into the plurality of blocks, classifying color temperatures with respect to each block, and applying different weights for each color temperature according to a light source priority.

Next, a white balance correcting method according to an exemplary embodiment will be described with reference to FIGS. 7 and 8.

Figure 7:
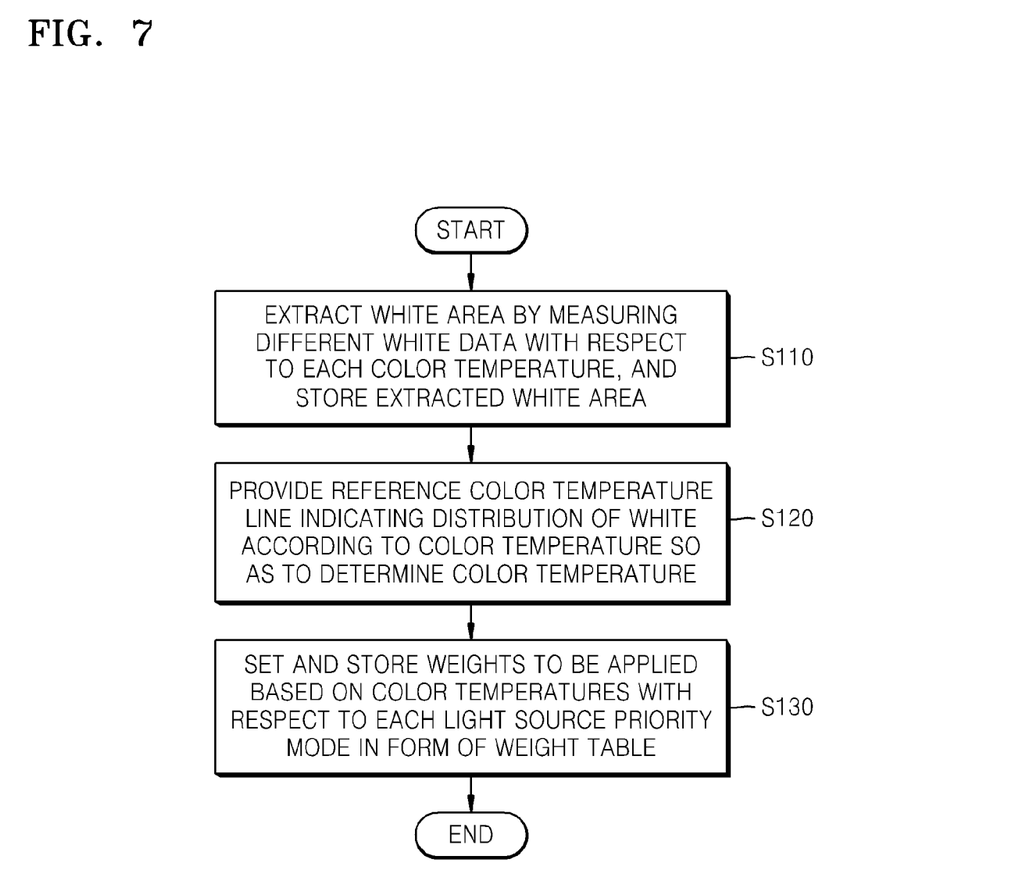
FIG. 7 is a flowchart illustrating a preprocessing method according to an exemplary embodiment.

FIG. 7 is a flowchart illustrating a preprocessing method according to an exemplary embodiment. Referring to FIG. 7, the preprocessor 100 extracts a white area by measuring different white data with respect to each color temperature, and stores an extracted white area (S110).

The preprocessor 100 provides a reference color temperature line indicating the distribution of white according to a color temperature (S120). The color temperature of color information (Dr, Db) may be determined using the reference color temperature line.

The preprocessor 100 sets and stores weights to be applied based on the color temperatures with respect to each light source priority mode in a form of a weight table (S130). In the present exemplary embodiment, the weight tables for color temperatures with respect to each light source priority mode have been described with reference to the high color temperature priority mode and the low color temperature priority mode, but the weight table are not limited thereto. The weight table may also be set to other light source priority modes, for example, a mercury lamp priority mode, a sodium lamp priority mode, and the like. In addition, the weights may be changed according to specifications of apparatuses.

The white area, the reference color temperature line, and the weight table, which are set by the preprocessor 100, may be loaded on the white balance corrector 300 at the time of the white balance correction.

Figure 8:
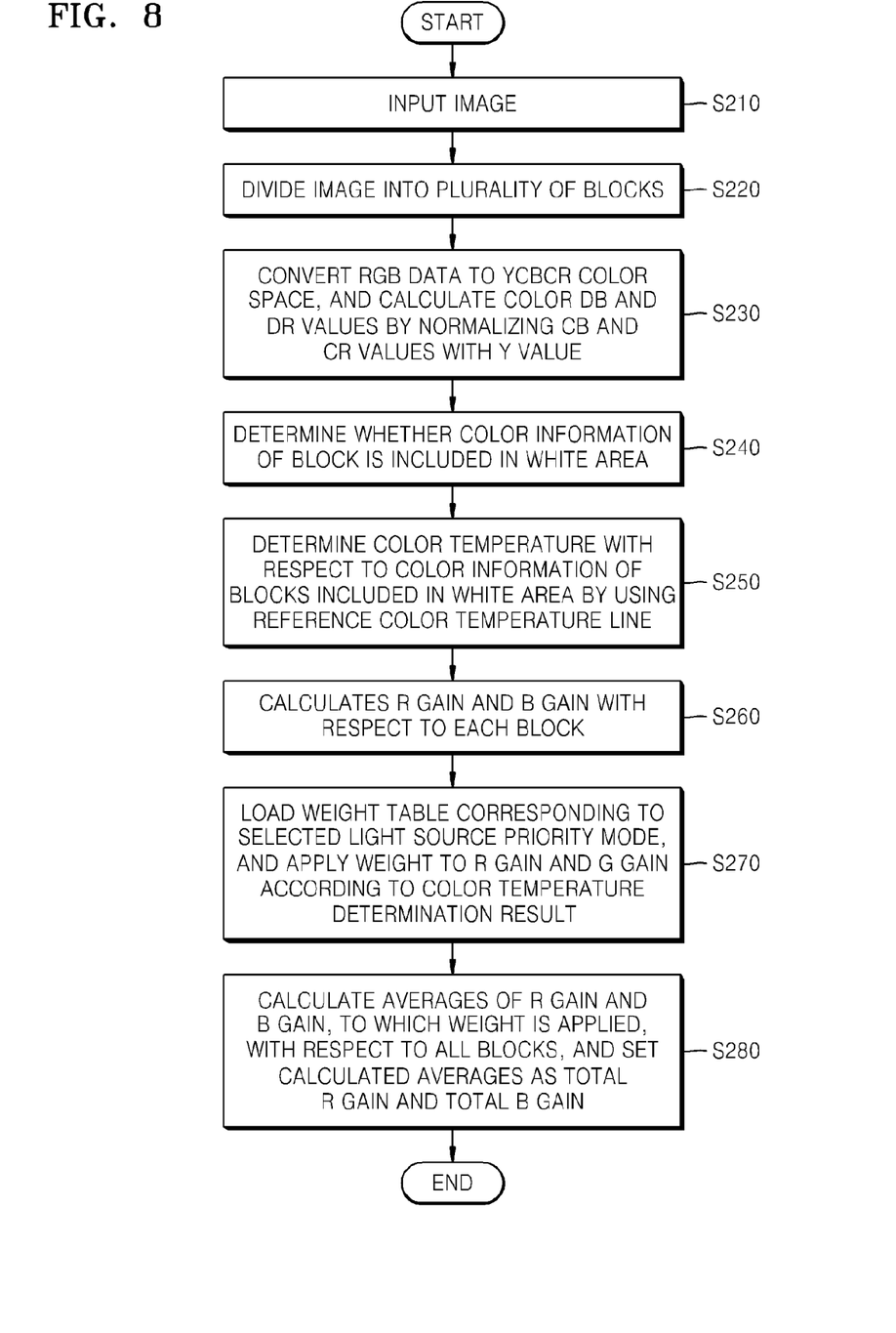
FIG. 8 is a flowchart illustrating a white balance correcting method according to an exemplary embodiment.

FIG. 8 is a flowchart illustrating a white balance correcting method according to an exemplary embodiment.

Prior to the white balance correction, a light source priority mode to be used for the white balance correction is selected. The controller 500 may provide a user with a menu (not illustrated) for selecting the light source priority mode. For example, the controller 500 may provide a menu allowing a user to use one of a high color temperature priority mode, a low color temperature priority mode, a mercury lamp priority mode, a sodium lamp priority mode, etc. When one of the light source priority modes is selected, the controller 500 loads the corresponding weight table from the preprocessor 100 to the white balance corrector 300, based on the white area, the reference color temperature line, and the selected light source priority mode.

Referring to FIG. 8, when an image is input (S210), the white balance corrector 300 divides the input image into a plurality of blocks (M×N blocks) (S220).

When the block division of the input image is completed, the white balance corrector 300 calculates an RGB average value of each block, converts the RGB average value to a YCbCr color space, and calculates color information (that is, Db and Dr values) by normalizing Cb and Cr values with a Y value (S230).

The white balance corrector 300 determines whether the color information (Dr, Db) of each block is included in the white area (S240). In this case, the white balance correction is performed with respect to the color information (Dr, Db) of blocks that are included in the white area, and the white balance correction is excluded with respect to the color information (Db, Db) of blocks that are not included in the white area.

The white balance corrector 300 determines the color temperature with respect to the color information of the blocks included in the white area by using the reference color temperature line (S250). When color information of an arbitrary block is positioned adjacent to the reference color temperature line, a point having the closest distance from the color information of the corresponding block to the reference color temperature line may be determined as the color temperature of the corresponding block.

The white balance corrector 300 calculates an R gain and a B gain with reference to the RGB average value of each block included in the white area (S260).

The white balance corrector 300 loads the weight table corresponding to the selected light source priority mode, extracts the weight from the weight table according to the color temperature determination result, and applies the extracted weight to the R gain and the G gain (S270).

The white balance corrector 300 calculates the averages of the R gain and the B gain, to which the weight is applied, with respect to all blocks, and sets the calculated averages as a total R gain and a total B gain (S280). The white balance corrector 300 performs the white balance correction by applying the total R gain and the total B gain to the input image.

As described above, according to the one or more of the above exemplary embodiments, it is possible to minimize color distortion due to light sources and improve image quality by performing a white balance correction of dividing an image into a plurality of blocks, classifying color temperatures with respect to each block, and applying different weights for each color temperature according to a light source priority.

The exemplary embodiments described above may be recorded on a computer-readable recording medium in a manner of being implemented into a program command type executable by various computers including at least one processor. The computer-readable recording medium can store a program command, a data file, a data structure, or combinations thereof. The program command recorded in the computer-readable recording medium is specially designed and configured for the exemplary embodiment or can be known in public to those skilled in the field of software. For example, the computer-readable recording medium includes a magnetic medium such as a hard disk, a floppy disk, and a magnetic tape, an optical medium such as a CD-ROM and a DVD, a magneto-optical medium such as a floptical disk, or such a hardware device specially configured to store and execute a program command as ROM, RAM, a flash memory, and the like. For example, the program command includes machine code created by a compiler or high-level language code executable by a computer using an interpreter and the like. The hardware device can be configured to operate as at least one software module to perform an operation of the exemplary embodiments, and vice versa.

The term "the" and the similar term used in the specification (in particular, claims) may correspond to both singular and plurality. If "range" is used in the exemplary embodiments, the exemplary embodiments may be regarded as including an individual value belonging to the "range." Therefore, even if a description corresponding to the "range" is not given, the individual value belonging to the "range" may be regarded as being written in the specific description of the exemplary embodiments.

Unless the order of the operations of the methods according to the exemplary embodiments are clearly indicated otherwise, the operations may be executed in an appropriate order. However, the exemplary embodiments are not limited to the order of the operations. All examples or exemplary terms (e.g., etc.) used in the specification are for simply describing the exemplary embodiments in detail. As long as the examples or the exemplary terms are not limited to the following claims, they do not limit the scope of the exemplary embodiments. Also, it will understood by those of ordinary skill in the art that the exemplary embodiments may be embodied according to design conditions and factors within the claims or equivalents including various changes, combinations, and modifications.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A white balance correcting apparatus comprising:
   at least one processor which implements:
   a white balance corrector configured to divide an input image into a plurality of blocks, determine, using a reference color temperature line, adjusted color temperatures of blocks included in a white area among the plurality of blocks, and calculate R and B gains to which different weights are applied according to the adjusted color temperatures of the blocks; and
   a preprocessor comprising a provider configured to provide the reference color temperature line indicating a distribution of white according to color temperatures of the plurality of blocks, so as to determine the adjusted color temperatures.

2. The white balance correcting apparatus of claim 1, wherein the preprocessor is configured to provide the white area, and provide a weight table in which the weights to be applied are set based on a light source priority mode.

3. The white balance correcting apparatus of claim 2, wherein the preprocessor further comprises:

an extractor configured to extract the white area by measuring different white data according to the color temperatures of the plurality of blocks; and a setter configured to set the weights to be applied based on the light source priority mode in the form of the weight table.

4. The white balance correcting apparatus of claim 2, further comprising a mode selector configured to select the light source priority mode for a white balance correction from among a plurality of light source priority modes.

5. The white balance correcting apparatus of claim 4, wherein the white balance corrector comprises:

a divider configured to divide the input image into the plurality of blocks;

an area determiner configured to determine whether color information of the blocks is included in the white area;

a color temperature determiner configured to determine, using the reference color temperature line, the adjusted color temperatures based on the color information of the blocks included in the white area;

a gain calculator configured to calculate a red (R) gain and a blue (B) gain of each of the blocks included in the white area, based on a red/green/blue (RGB) average value of each of the respective blocks; and a weight applicator configured to load a weight table corresponding to the selected light source priority mode, extract, from the weight table, weights corresponding to the adjusted color temperatures of each of the blocks included in the white area, and apply the extracted weights to the R gain and the B gain of each of the respective blocks.

6. The white balance correcting apparatus of claim 5, further comprising a data converter configured to convert the RGB average value of each of the blocks included in the white area to a luminance/chroma: blue/chroma: red (YCbCr) color space, calculate Db and Dr values by normalizing chroma: blue (Cb) and chroma: red (Cr) values with a luminance (Y) value, and provide the Db and Dr values as the color information of each of the respective blocks.

7. The white balance correcting apparatus of claim 6, wherein the area determiner is further configured to exclude blocks of the plurality of blocks, the color information of which are not included in the white area, from the white balance correction.

8. The white balance correcting apparatus of claim 4, further comprising an average gain calculator configured to calculate averages of the R gains and the B gains, to which the weight is applied, with respect to the plurality of blocks, and set the calculated averages as a total R gain and a total B gain, respectively.

9. The white balance correcting apparatus of claim 5, wherein in response to the color information of a block of the plurality of blocks being positioned adjacent to the reference color temperature line, the color temperature determiner is further configured to determine a point, which has a closest distance from the color information of the block to the reference color temperature line, as the adjusted color temperature of the block.

10. A white balance correcting method comprising:
dividing an input image into a plurality of blocks;
determining whether color information of the plurality of blocks is included in a white area;
determining, using a reference color temperature line, an adjusted color temperature with respect to the color information of blocks included in the white area among the plurality of blocks;

calculating a red (R) gain and a blue (B) gain of the blocks included in the white area, based on a red/green/blue (RGB) average value of each of the blocks;

loading a weight table corresponding to a light source priority mode, extracting weights from the weight table according to the determined adjusted color temperatures, and applying extracted weights to the R gain and the B gain of each of the blocks, respectively; and providing the reference color temperature line indicating distribution of white according to color temperatures of the plurality of blocks, so as to determine the adjusted color temperatures.

11. The white balance correcting method of claim 10, further comprising providing the white area, and providing the weight table in which the weights to be applied are set based on the light source priority mode.

12. The white balance correcting method of claim 11, wherein the providing the white area comprises extracting the white area by measuring different white data according to the color temperatures of the plurality of blocks; and wherein providing the weight table comprises setting the weights to be applied based on the adjusted color temperatures with respect to the light source priority mode in the form of the weight table.

13. The white balance correcting method of claim 11, further comprising selecting the light source priority mode for a white balance correction from among a plurality of light source priority modes.

14. The white balance correcting method of claim 13, further comprising converting the RGB average value of each of the blocks to a luminance/chroma: blue/chroma: red (YCbCr) color space, calculating Db and Dr values by normalizing chroma: blue (Cb) and chroma: red (Cr) values with a luminance (Y) value, and providing the Db and Dr values as the color information of each of the respective blocks.

15. The white balance correcting method of claim 13, wherein blocks of the plurality of blocks, the color information of which are not included in the white area, are excluded from the white balance correction.

16. The white balance correcting method of claim 13, further comprising calculating averages of the R gain and the B gain of each of the blocks, to which the weight is applied, with respect to the plurality of blocks, and setting the calculated averages as a total R gain and a total B gain, respectively.

17. The white balance correcting method of claim 13, wherein in response to the color information of a block of the plurality of blocks being positioned adjacent to the reference color temperature line, determining a point, which has a closest distance from the color information of the block to the reference color temperature line, as the adjusted color temperature of the block.

18. A non-transitory computer readable medium having recorded thereon a program, which when executed by a computer, causes the computer to perform a method comprising:
dividing an image into a plurality of blocks;
determining adjusted color temperatures of blocks included in a white area among the plurality of blocks based on color information of the blocks and a reference color temperature line;
calculating red (R) and blue (B) gains to which different weights are applied based on the determined adjusted color temperatures of the blocks; and
providing the reference color temperature line indicating distribution of white according to color temperatures of the plurality of blocks, so as to determine the adjusted color temperatures.

19. The non-transitory computer readable medium of claim 18, wherein the weights to be applied are extracted from a weight table corresponding to a selected light source priority mode among a plurality of light source priority modes.

* * * * *